United States Patent [19]

Bartos

[11] Patent Number: 5,398,743
[45] Date of Patent: Mar. 21, 1995

[54] TIRE INFLATING AND DEFLATING SYSTEM

[75] Inventor: Josef A. Bartos, Diamond Bar, Calif.

[73] Assignee: Tire Inflation Systems Corp., Willoughby, Ohio

[21] Appl. No.: 125,681

[22] Filed: Sep. 24, 1993

[51] Int. Cl.⁶ .............................................. B60C 23/00
[52] U.S. Cl. .................... 152/416; 152/417; 137/225
[58] Field of Search ............... 152/415, 416, 417; 137/223, 225

[56] References Cited

U.S. PATENT DOCUMENTS

| | | | |
|---|---|---|---|
| 1,072,907 | 9/1913 | Brooks | 152/415 |
| 1,827,662 | 10/1931 | Maas | 152/416 |
| 2,059,045 | 10/1936 | Seymour | 137/225 |
| 2,685,906 | 8/1954 | Williams | 152/417 |
| 2,976,905 | 3/1961 | Kamm et al. | 152/417 |
| 3,276,502 | 10/1966 | Ruf | 152/417 |
| 4,582,107 | 4/1986 | Scully | 152/417 |
| 4,641,698 | 2/1987 | Bitonti | 152/416 |
| 4,678,017 | 7/1987 | Schultz | 152/416 |
| 4,892,128 | 1/1990 | Bartos | 152/417 |

FOREIGN PATENT DOCUMENTS 214450  8/1957  Australia .

*Primary Examiner*—Michael W. Ball
*Assistant Examiner*—Francis J. Lorin
*Attorney, Agent, or Firm*—Vickers, Daniels & Young

[57] ABSTRACT

A normally closed wheel valve for maintaining an existing air pressure in a tire of a vehicle having a system for inflating and deflating the tire is mounted on the outer end of the wheel hub for rotation therewith and is connected in communication with a source of air under pressure on the vehicle through a coupling on the outer end of the valve which is rotatable relative thereto. The valve comprises axially opposed pneumatically actuated diaphragm elements for controlling the flow of air to and from a pair of tires rotatably mounted on a common axle of the vehicle.

31 Claims, 6 Drawing Sheets

TIRE INFLATING AND DEFLATING SYSTEM

BACKGROUND OF THE INVENTION

This invention relates to the art of onboard systems for inflating and deflating the tires of a wheeled vehicle and, more particularly, to an improved tire isolating valve for use in such a system to maintain a desired tire pressure following an inflation or deflation operation.

It is well known in the art to provide vehicles with onboard systems for achieving inflating and deflating of vehicle tires in order to optimize operation of the vehicle under variable and changing conditions including, for example, weather, vehicle load, terrain and vehicle speed. Such systems generally include a source of air under pressure on the vehicle and manually operable controls for selectively inflating or deflating the vehicle tires to respectively increase or decrease an existing tire pressure. Such systems further include a wheel valve or tire isolating valve which is operable to maintain air under pressure in each vehicle tire independently of the other tires so that a problem such as a leak in one tire does not affect the air pressure in the other tires. In connection with such a tire isolating feature, it is generally the practice to connect the source of air under pressure on the vehicle to each wheel assembly of the vehicle through passages drilled in the fixed axle upon which the wheel assembly is rotatably mounted or passages drilled in the hub which is rotatable relative to the axle and which carries the tire. In either instance a sealing arrangement is required between the fixed and rotating parts to preclude the leakage of air therebetween. The tire isolating valve is preferably between the sealing arrangement and the tire or tires of the wheel assembly so that the sealing arrangement is not subjected to system air under pressure other than at times of operation of the system to achieve inflation or deflation. While such prior arrangements provide a sealed air flow path between the onboard air supply and the tires of a vehicle, they are structurally complex and expensive and, often, require special seal designs and/or special designs or major modifications of otherwise standard vehicle axle, hub and/or bearing components to accommodate the air flow passages and seal assemblies. Such designs and modifications often result in component parts which are limited in use to a given wheel and axle assembly design for a given onboard tire inflating and deflating system. Furthermore, such special modifications or design can effect the structural integrity of component parts of the wheel and axle assembly and do not lend to the efficient and economical retrofitting of a vehicle to provide the latter with an onboard tire inflating and deflating system. Arrangements of the foregoing character including bored passageways through a fixed axle or the hub of the wheel assembly together with sealing arrangements between the axle and hub are shown for example in U.S. Pat. No. 2,976,906 to Kamm et al and in my U.S. Pat. No. 4,892,128.

It has also been proposed as shown in U.S. Pat. No. 2,685,906 to Williams to provide a tire isolating valve in the form of relatively rotatable valve parts, one of which is mounted on the hub of a vehicle wheel for rotation therewith and provided with a conduit for connecting the valve to the corresponding tire. The other valve part has a conduit for connecting the valve to the source of air under pressure on the vehicle and includes a pneumatically actuated piston for displacing a conventional tire valve element of the valve unit between open and closed positions to achieve tire inflating and deflating. While an arrangement such as that shown in Williams avoids having to bore air passageways in the axle and/or hub components of a vehicle wheel assembly, the valve is structurally complex and expensive, requires an excessive amount of axial space relative to the hub to accommodate the component parts thereof and, in particular, actuating displacement of the movable parts thereof. Moreover, the valve includes both valve and seal components which are exposed to excessive wearing interengagement during operation of the valve with the vehicle in motion. Moreover, the pneumatically actuated piston by which the valve is operated is in the axially outer part of the valve relative to the vehicle wheel and, thus, is more exposed to potential damage than are the component parts which are in the valve part attached to the wheel hub. Still further, insofar as individual tire pressure is concerned, the valve is not capable of inflating or deflating dual tires on a common hub assembly on one end of a vehicle axle.

SUMMARY OF THE INVENTION

In accordance with the present invention, a wheel valve or tire isolating valve is provided which advantageously overcomes the foregoing and other disadvantages encountered in connection with tire inflation systems and wheel valves heretofore available. More particularly in this respect, a wheel valve in accordance with the present invention includes a valve housing mounted on the axially outer end of the hub portion of a wheel assembly for rotation therewith and enclosing all of the flow controlling components of the valve, none of which have frictionally interengaging surfaces. The valve housing has an air port or ports for connecting the wheel valve with a tire or tires mounted on the wheel hub, and an air supply coupling is rotatably supported on the axially outer end of the valve housing for connecting the valve with a source of air under pressure on the vehicle through a drop line from the vehicle. The juncture between the valve housing and supply coupling is sealed and defines the sole area of frictional interengagement between relatively moving parts defining the air flow path and flow control components of the wheel valve unit. Accordingly, minimum wear is experienced during use of the valve thus promoting a longer useful life therefor.

In a preferred embodiment, the wheel valve is adapted to control both the inflation and deflation of a pair of tires mounted on the hub component and, for this purpose, includes a pair of pneumatically actuated diaphragm valve assemblies, each associated with a different one of the two tires. Each diaphragm valve assembly includes an annular diaphragm chamber having a central port normally closed by the corresponding diaphragm and which is adapted to be connected through the aforementioned air port to a corresponding one of the two tires. Each of the diaphragm chambers is connected to the source of air under pressure on the vehicle through a manifold arrangement in the valve housing which communicates with the coupling rotatably mounted on the axially outer end thereof. Accordingly, all of the component parts of the valve which are operable to control the flow of air to and from the tires are at the axially innermost location possible with respect to the wheel hub so as to optimize protection thereof from damage. Moreover, the diaphragm valve assemblies are preferably coaxial and axially opposed with a common biasing spring arrangement therebetween for biasing the diaphragms against the central air ports, whereby the axial dimension of the valve housing is advantageously minimized to promote both compactness of the wheel valve and protection thereof from damage. Furthermore, since the only function of the coupling on the axially outer end of the valve housing is to provide communication with the source of air under pressure on the vehicle, the axial dimension of the coupling can likewise be minimized to further promote compactness of the wheel valve and protection thereof from damage. The construction of the wheel valve further minimizes the number of component parts and enhances the manufacturing process, thus to promote economy with respect thereto while, at the same time, promoting efficiency with respect to the operation thereof.

It is accordingly an outstanding object of the present invention to provide an improved pneumatically actuated wheel valve for use with an onboard system for inflating and deflating the tires of a wheeled vehicle.

Another object is the provision of a wheel valve of the foregoing character which is mountable on the hub component of a wheel assembly and includes a valve housing portion rotatable with the hub assembly and an air line coupling portion rotatable relative to the valve housing for connecting the valve to a source of air under pressure on the vehicle.

A further object is the provision of a wheel valve of the foregoing character wherein there is no frictional sliding interengagement between the flow controlling components of the valve and wherein all of the flow controlling components of the valve are in the valve housing and thus at the axially innermost location relative to the hub to optimize protection thereof.

Yet another object is the provision of a wheel valve of the foregoing character which is capable of controlling both the inflating and deflating of a pair of tires common to the hub on which the wheel valve is mounted.

Still a further object is the provision of a wheel valve of the foregoing character which is axially compact, thus to minimize exposure to damage and which is comprised of a minimum number of component parts structurally interrelated so as to promote economy in the manufacturing the valve and efficiency with respect to operation thereof.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which.

DESCRIPTION OF A PREFERRED EMBODIMENT

Figure 1:
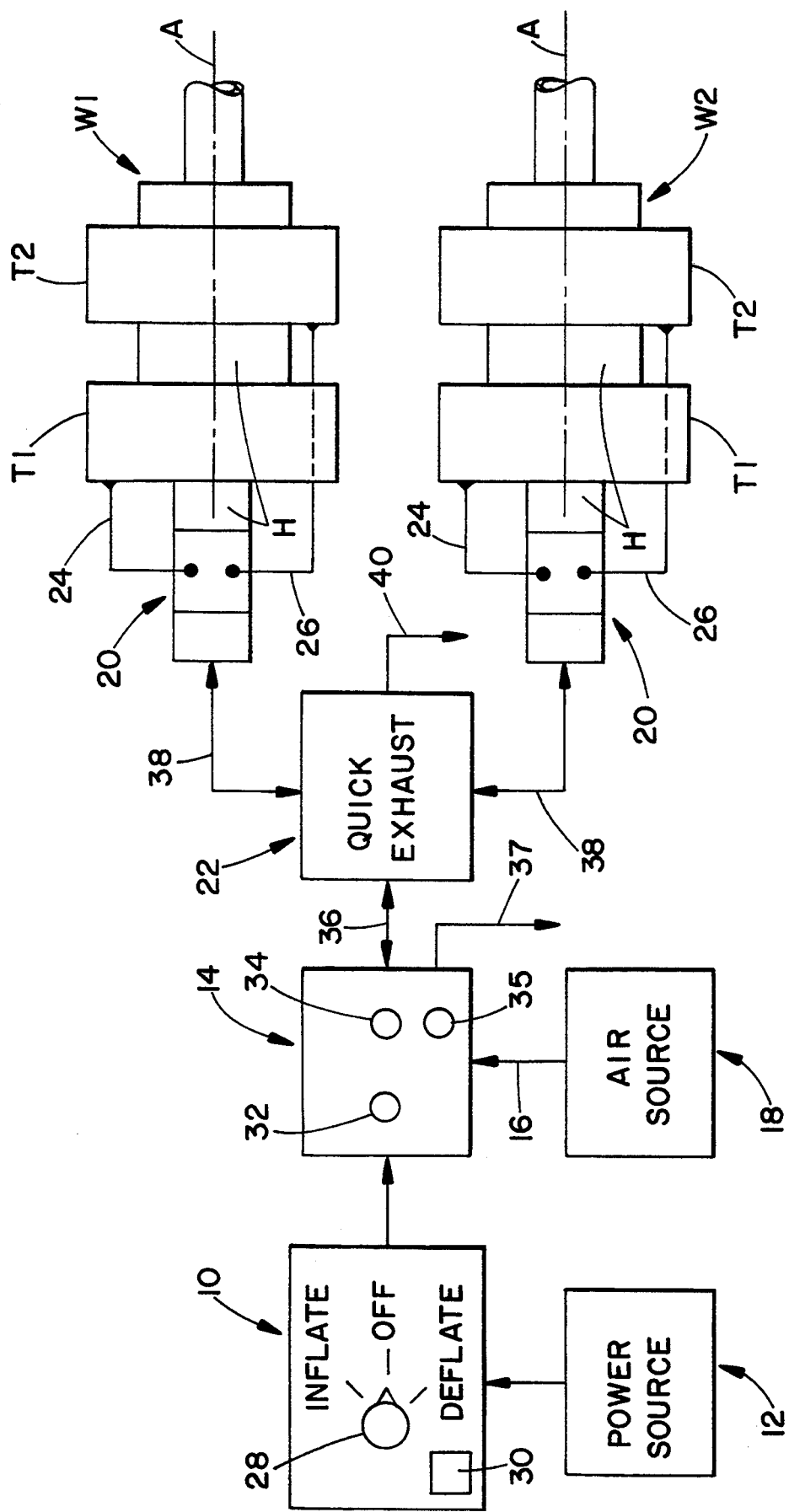
FIG. 1 is a schematic illustration of a vehicular tire inflating and deflating system including a wheel valve in accordance with the present invention.

Referring now in greater detail to the drawings, wherein the showings are for the purpose of illustrating a preferred embodiment of the invention only and not for the purpose of limiting the invention, FIG. 1 schematically illustrates the component parts of a vehicle tire inflating and deflating system with which a tire isolating valve in accordance with the present invention is adapted to be used. In this respect, the system includes an electric control module 10 connected to a suitable power source 12 such as the vehicle battery, a pneumatic control module 14 having an air inlet passageway connected to a supply line 16 from a source of air under pressure 18 such as an onboard air supply for the vehicle brakes. A tire isolating valve in accordance with the preferred embodiment of the present invention is adapted to individually control the flow of air to and from dual tires of a vehicle wheel assembly mounted on a common axle of the vehicle and, accordingly, the system is schematically illustrated in FIG. 1 to include a pair of wheel assemblies W1 and W2 each comprised of dual tires T1 and T2 mounted on a common hub H for rotation together about a corresponding wheel axis A. As will be described in greater detail hereinafter, a tire isolating valve 20 in accordance with the preferred embodiment of the present invention is mounted on the axially outer end of hub H. Valve 20 is in flow communication with air source 18 through pneumatic control module 14 and a quick exhaust valve 22 between the tire isolating valve and control module 14. As will likewise be described in greater detail hereinafter, tire isolating valve 20 is in flow communication with the corresponding tire T1 through a line 24 and the corresponding tire T2 through a line 26.

Electric control module 10 is adapted to be mounted in the cab of a vehicle and comprises a control panel including a selector component 28 which is manually displaceable from the normal OFF position to either the INFLATE or DEFLATE positions for respectively inflating or deflating tires T1 and T2. Control module 10 further includes a depressible switch button 30 by which the electric control module and thus the system is connected to and disconnected from power source 12. Pneumatic control module 14 includes inflate and deflate flow control vales 32 and 34, respectively, which are normally closed and which are opened in response to displacement of selector component 28 to the corresponding one of the inflate and deflate positions thereof. The opening of either of the valves 32 and 34 places air under pressure from source 18 in communication with tire isolating valves 20 and thus tires T1 and T2 through line 36 from pneumatic control module 14, quick exhaust valve 22 and drop lines 38 between valve 22 and the tire isolating valves of wheel assemblies W1 and W2.

Air source 18 is adapted to supply air to the system at a pressure higher than the highest desired tire pressure, and inflate valve 32 is adapted to supply air to the tire isolating valves at the highest desired pressure of, for example, 115 psi. Deflate valve 34 is adapted to supply air to the tire isolating valves at a pilot pressure to initiate a deflating operation and which pilot pressure is less than the lowest desired tire pressure of, for example, 35 psi. Pneumatic control module 14 further includes a normally closed vent valve 35 which is open during the deflating mode to vent air from the tires to atmosphere through vent line 37. Vent valve 35 remains open following a deflating operation and opens at the conclusion of an inflating operation to assist in exhausting system air to atmosphere between tire isolating valve 20 and pneumatic control module. 14. Further, quick exhaust valve 22 has a normally open exhaust line 40 by which air in the system between tire isolating valves 20 and pneumatic control module 14 is exhausted to atmosphere at the conclusion of a tire inflating or deflating operation. More particularly in this respect, during both inflating and deflating operations of the system, air under pressure in the system between control module 14 and tire isolating valves 20 maintains exhaust port 40 in quick exhaust valve 22 closed. At the end of the inflating or deflating operation, the appropriate one of the inflating and deflating valves 32 and 34 closes, air flow from source 18 stops, and the isolating valves 20 close, whereby the pressure in the system between control module 14 and tire isolating valves 20 decreases as air flows across vent valve 35 and vent line 37 to atmosphere. This pressure drop triggers quick exhaust valve 22 to open so as to quickly exhaust air under pressure from the system upstream of tire isolating valves 20. It will be appreciated that tire inflating valve 32 can be designed to provide the maximum tire pressure at 115 psi, or can be an adjustable valve to provide a maximum pressure of or other than 115 psi, and that likewise, deflating valve 34 can be designed for the minimum tire pressure of 35 psi or can be adjustable to provide a minimum tire pressure of or other than 35 psi.

Figure 2:
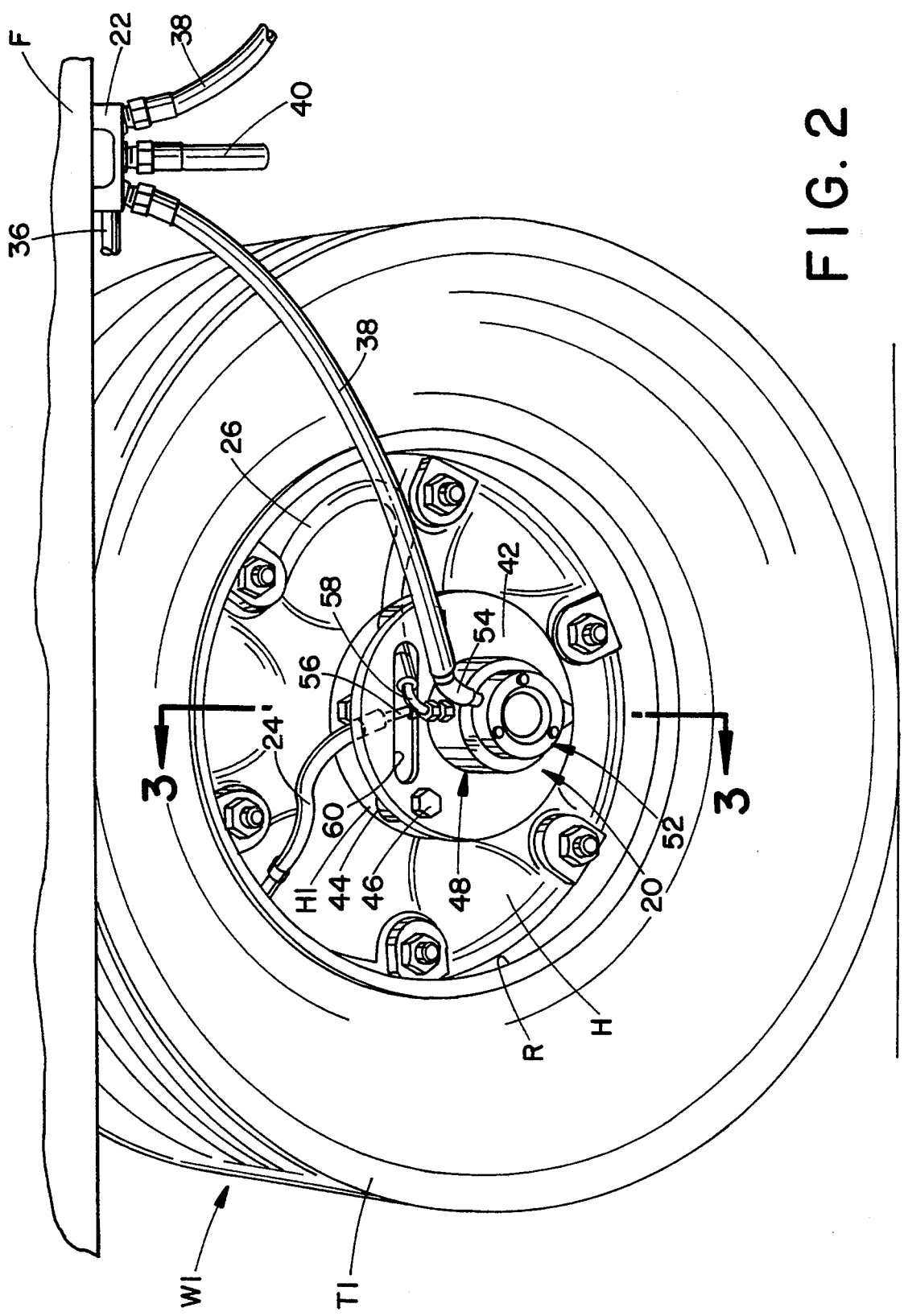
FIG. 2 is a perspective view of a wheel unit of a vehicle having a wheel valve in accordance with the present invention mounted on the axially outer end of the hub thereof.

Referring now in particular to FIG. 2, wherein axially outer tire T1 of wheel unit W1 is illustrated by way of example, hub H includes a rim R on which tire T1 is mounted, and the hub includes a central portion H1 having an axially outer end to which tire isolating valve 20 is secured by means of a mounting plate 42, spacers 44 and mounting bolts 46 which extend into threaded openings therefor in hub portion H1. Tire isolating valve 20 includes a valve housing 48 secured to mounting plate 42 by bolts 50, and a coupling housing 52 rotatably supported on valve housing 48 as described more fully hereinafter. Quick exhaust valve 22 is mounted on a frame portion F of the vehicle above and generally centrally between wheel units W1 and W2, and coupling housing 52 is provided with a fitting 54 by which tire isolating valve 20 is connected in flow communication with quick exhaust valve 22 through drop line 38. As will be appreciated from the foregoing description of FIG. 1, isolating valve 22 is in flow communication with pneumatic control module 14 through line 36, and a second drop line 38, only a portion of which is shown in FIG. 2, is connected to wheel isolating valve 20 of wheel unit W2. Valve housing 48 is provided with fittings 56 and 58 which are located on axially opposite sides of mounting plate 42 and by which the tire isolating valve is connected in flow communication with tires T1 and T2 of wheel assembly W1 thorough lines 24 and 26, respectively. With regard to tire T2 which is not visible in FIG. 2, mounting plate 42 is provided with an opening 60 through which line 26 extends from fitting 58, and line 26 extends through an opening between adjacent spokes of hub H to tire T2 which is axially behind tire T1. From the description thus far, it will be appreciated that valve housing 48 and lines 24 and 26 rotate with hub H and thus tires T1 and T2, and that coupling housing 52 which is rotatable relative to valve housing 48 is restrained from rotating therewith by drop line 38.

Figure 3:
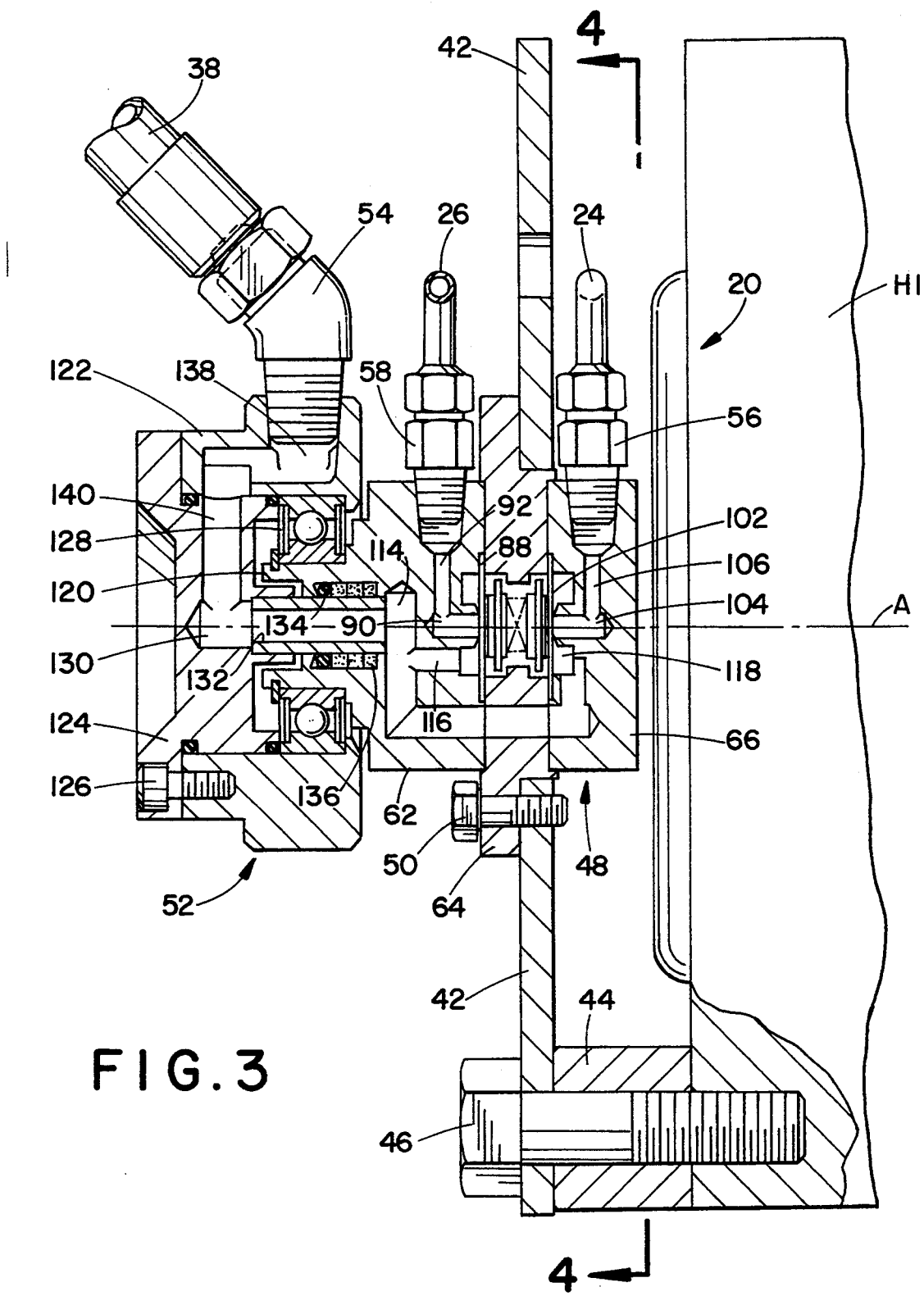
FIG. 3 is a sectional elevation view of the wheel valve taken along line 3—3 in FIG. 2.
Figure 3A:
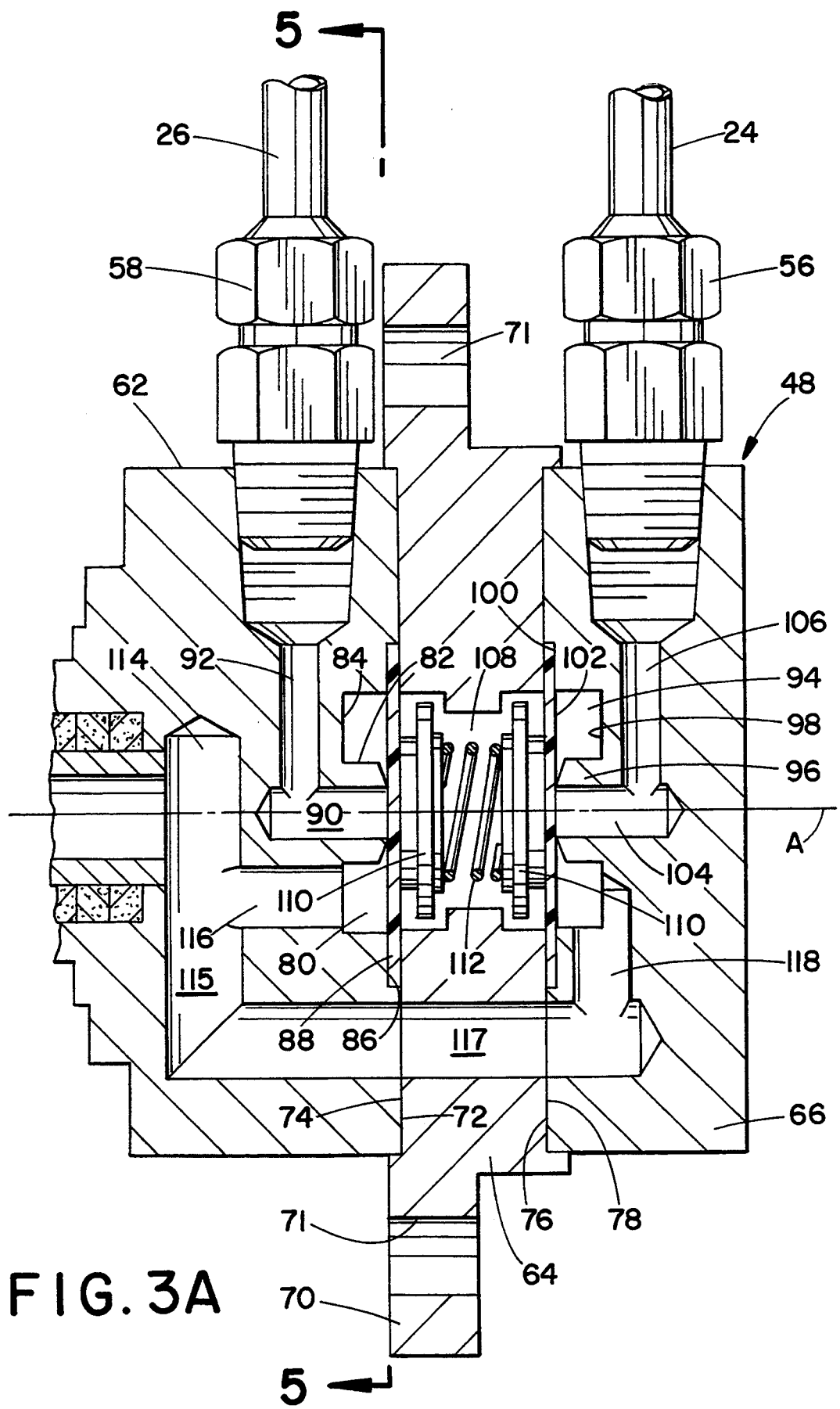
FIG. 3A is an enlarged detail view, in section, showing the diaphragm chambers of the valve; I.
Figure 4:
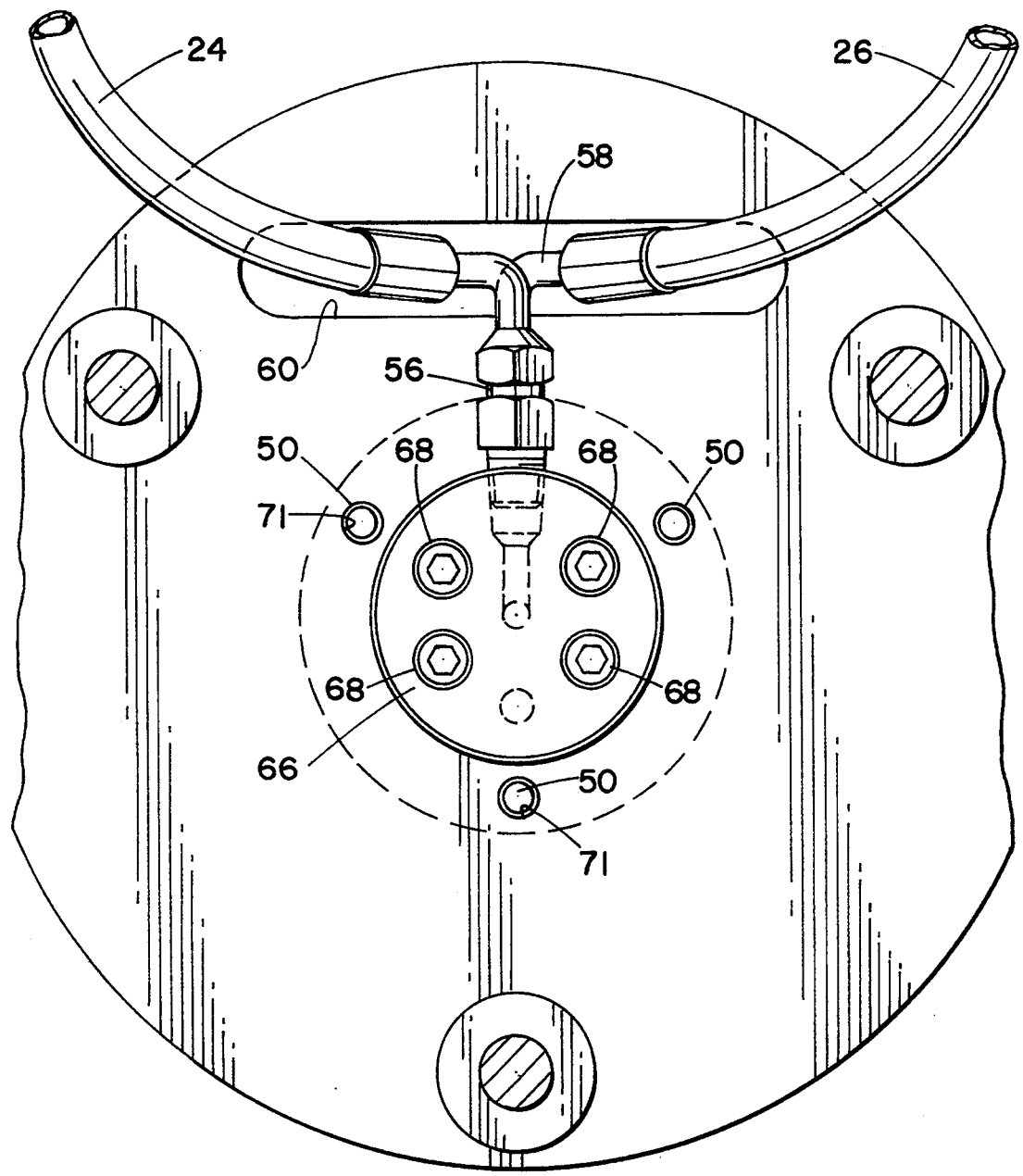
FIG. 4 is an end elevation view of the valve as seen along line 4—4 in FIG. 3.
Figure 5:
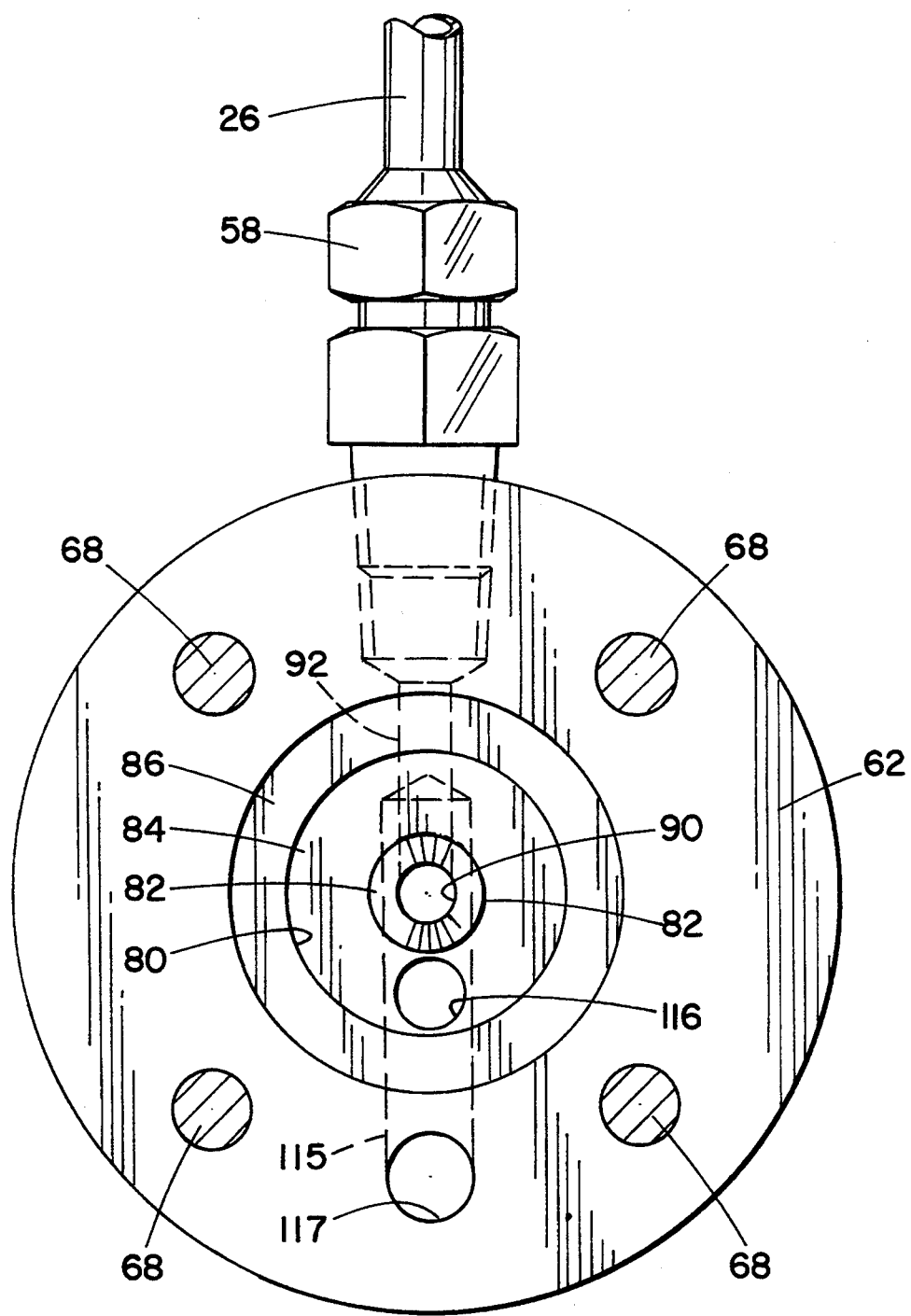
FIG. 5 is a cross-sectional elevation view of the wheel valve looking in the direction of line 5—5 in FIG. 3A.

Referring now in particular to FIGS. 3-5 of the drawing, valve housing 48 is comprised of axially outer, intermediate and axially inner valve housing members 62, 64 and 66, respectively, relative to the axially outer end of hub portion H1. Housing members 62, 64 and 66 are axially interengaged by a plurality of allen head fasteners 68 extending thereinto from the axially inner end of housing member 66, and intermediate housing member 64 has a peripheral flange 70 extending radially outwardly of the outer peripheries of housing members 62 and 66 and by which valve housing 48 and thus the tire isolating valve is secured to mounting plate 42 by bolts 50 which extend through openings 71 therefor in flange 70. As best seen in FIG. 3A, axially outer housing member 62 has an axially inner surface 72 facially engaging an axially outer surface 74 of intermediate housing member 64, and axially inner housing member 66 has an axially outer surface 76 facially engaging axially inner surface 78 of intermediate housing member 64.

Axially outer housing member 62 is provided with a first diaphragm chamber defined by an annular recess 80 in axially inner surface 72 thereof and which recess surrounds a central post 82 and has a bottom wall 84 and an open end in the form of an annular shoulder 86 surrounding recess 80. The open end of recess 80 is closed by a diaphragm 88 of suitable elastomeric material which is clampingly engaged between shoulder 86 and axially outer surface 74 of intermediate housing member 64. Post 82 is provided with an axial bore 90 providing an air port having an upstream end normally engaged and closed by diaphragm 88 and a downstream end connected to a passage 92 communicating with fitting 58 for tire line 26. Axially inner valve housing member 66 is provided with a second diaphragm chamber defined by an annular recess 94 in axially outer surface 76 thereof and which is axially opposed to and coaxial with recess 80. Recess 94 surrounds a central post 96 and has a bottom wall 98 and an open end in the form of an annular shoulder 100 surrounding the recess. Annular recess 94 is covered by a diaphragm 102 of suitable elastomeric material which is clampingly engaged between shoulder 100 and axially inner surface 78 of intermediate housing member 64. Post 96 is provided with an axial bore 104 providing an air port having an upstream end normally engaged and closed by diaphragm 102 and having a downstream end connected to a passageway 106 communicating with fitting 56 for tire line 24. Intermediate housing member 64 is provided with a spring bore 108 therethrough coaxial with axis A and which receives a diaphragm backup member 110 for each of the diaphragms 88 and 102 and a common compression spring 112 by which the diaphragms are normally biased against the upstream end of the corresponding one of the air ports 90 and 104.

The axially outer, intermediate and axially inner valve housing members are bored to provide an air flow passageway therethrough having an upstream end 114 which, as will become apparent hereinafter, is in flow communication with drop line 38. Passageways 92 and 106 described above respectively provide first and second downstream ends for the passageway. This passageway further includes a radially extending passageway portion 115 in housing member 62 and a port 116 opening therefrom into annular recess 80 through bottom wall 84 thereof, and a passageway portion 117 extending from portion 115 axially through the housing members and having a radially extending end 118 opening into annular recess 94. It will be appreciated that air under pressure in tires T1 and T2 is imposed against diaphragms 88 and 102, respectively. Accordingly, the diameters of the air ports provided by bores 90 and 104 and the biasing force of spring 112 are designed to maintain the upstream ends of the air ports closed under the highest tire pressure to be maintained in the tires such as the 115 psi referred to herein. It will likewise be appreciated that the surface areas of diaphragms 88 and 102 exposed to air under pressure entering recesses 80 and 94 through passageway portions 116 and 118 is considerably greater than the surface area of the diaphragms exposed to air under pressure from the tires. Accordingly, pilot air under a pressure of 25 psi for example, which is less than the lowest pressure to be maintained in the tires, for example 35 psi, is operable to displace diaphragms 88 and 102 from the upstream ends of the air ports during a deflating operation.

As best seen in FIG. 3, the axially outer end of axially outer housing member 62 is radially stepped inwardly to provide an annular sleeve 120 coaxial with axis A, and coupling housing 52 is generally cup-shaped in cross-section and comprises an annular skirt member 122 and an outer end member 124 secured thereto by a plurality of allen head fasteners 126. The axially inner end of skirt 122 radially overlies sleeve 120, and valve housing 48 and coupling housing 52 are interengaged for relative rotation by a bearing unit 128 mounted between sleeve 120 and skirt 122. The axially inner side of end member 124 is provided with a bore 130 coaxial with axis A and which receives a tubular sleeve 132 which is suitably secured therein such as by a press fit. Sleeve 132 is coaxial with axis A and has an axially inner end which opens into upstream 114 of the air passageway through valve housing 48. Sleeve 132 is radially spaced inwardly from valve housing sleeve 120, and the radially inner side of sleeve 120 is provided with a radially inwardly facing annular recess, not designated numerically, which receives an 0-ring seal 134 and a plurality of synthetic felt washers 136 which provide a reservoir for lubricant for lubricating the interface between the sleeves 120 and 132.

Skirt 122 and end member 124 of coupling housing 52 are bored to provide an air passageway having an upstream end 138 and a downstream end 140 which opens into bore 130. Upstream end 138 opens radially through the outer periphery of skirt 122 which is provided with fitting 54 for communicating the passageway with drop line 38. It will be appreciated from the foregoing description that the air flow passageway through coupling housing 52 and valve housing 48 has upstream and downstream ends with respect to the direction of flow of air from the source on the vehicle to the tires. Accordingly, in the embodiment described, the upstream end of the air flow passageway is passageway portion 138 opening radially into the outer periphery of coupling housing 52 and the downstream end comprises first and second downstream ends defined by passages 92 and 106 opening radially through the outer peripheries of valve housing members 62 and 66, respectively.

Assuming the tire inflation system to be activated and the existing tire pressure to be the lower tire pressure of 35 psi, for example, inflation of the tires to the higher pressure is achieved as follows. The operator displaces selector 28 to the INFLATE position whereupon normally closed inflate valve in pneumatic control module 14 opens and normally closed deflate valve 34 and vent valve 35 remain closed. Air under pressure then flows from source 18 through control module 14 and line 36 to quick exhaust valve 22, whereupon normally open exhaust line 40 therein closes, and the air under pressure flows through drop line 38 to tire isolating valve 20. Air under pressure enters the upstream end of the air flow passageway through coupling housing 52 and valve housing 48 and flows into the first and second diaphragm chambers through passageways 116 and 118 opening into recesses 80 and 94, respectively. The air under pressure acting against the undersides of diaphragms 88 and 102 displaces the latter from the upstream end of the corresponding one of the air ports 90 and 104 against the bias of spring 112, whereupon the air under pressure flows through the air ports to tire lines 24 and 26 and the corresponding tire to inflate the latter to the higher pressure. When the inflation pressure is reached, inflate valve 32 closes whereby the air flow stops, spring 112 biases diaphragms 88 and 102 to close air ports 90 and 104, and vent valve 35 opens for air under pressure between pneumatic control module 14 and tire isolating valve 20 to vent to atmosphere through vent line 37. The decreasing pressure resulting from opening of the vent valve causes quick exhaust valve 22 to open for air to quickly exhaust to atmosphere through line 40.

To deflate the tires to the lower pressure, the operator moves selector 28 to the DEFLATE position whereupon deflate valve 34 opens and normally closed inflate valve 32 and vent valve 35 remain closed. Valve 34 provides for the flow of air at a pilot pressure of 25 psi, for example, to flow through line 36 and quick exhaust valve 22, whereupon normally open exhaust line 40 is closed. The pilot air then flows through drop line 38 to the inlet end of the passageway through the tire isolating valve and into the diaphragm chamber recesses 80 and 94 through ports 116 and 118, respectively. The air at the pilot pressure is operable against the undersides of the diaphragms to displace the latter from the upstream ends of air ports 90 and 104 against the bias of spring 112, whereupon air in the tires which is at a higher pressure than the pilot pressure flows into the diaphragm chamber recesses through air ports 90 and 104 and thence through the upstream end 138 of the air passageway through drop line 38, quick exhaust valve 22 and line 36 to pneumatic control module 14. This pressure being higher than the set pressure resulting from displacing selector 28 to the DEFLATE position results in the opening of vent valve 35 and thus the flow of air under pressure from the tires to atmosphere through vent line 37. When the set pressure of 35 psi is reached, deflate valve 34 closes to stop the flow of pilot air, whereupon spring 112 closes diaphragms 88 and 102 against the upstream ends of air ports 90 and 104 to stop the flow of air from the tires. Vent valve 35 remains open and the resulting drop in pressure between pneumatic control module 14 and tire isolating valve 20 results in the opening of quick exhaust valve 22 so that the air under pressure between the control module and tire valve is quickly exhausted to atmosphere through exhaust line 40.

While considerable emphasis has been placed herein on the structures of and the structural interrelationships between the component parts of the preferred embodiment of the present invention, it will be appreciated that other embodiments can be made and that many changes can be made in the preferred embodiment without departing from the principles of the invention. In particular in this respect, it will be appreciated that the tire isolating valve can be used in conjunction with a single tire as opposed to the dual tire arrangement of the preferred embodiment such as by closing off one of the two downstream ends of the air flow passageway through the valve. Further, mounting of the tire isolating valve on the axially outer end of a vehicle wheel hub can be achieved other than by the mounting plate arrangement disclosed herein. These and other modifications will be obvious to those skilled in the art from the disclosure of the preferred embodiment, whereby it is to be distinctly understood that the foregoing descriptive matter is to be interpreted merely as illustrative of the present invention and not as a limitation.

I claim:

1. A tire isolating valve for use in a vehicle tire pressure control system for inflating and deflating a tire on rotatable wheel means of said vehicle, said system having a source of air under pressure and control means for communicating said source with said tire during inflation and deflation of said tire, said valve comprising a valve housing mountable on said wheel means for rotation therewith about a wheel axis, an annular chamber in said housing coaxial with said wheel axis and having a bottom wall and an axially outer end spaced from said bottom wall, a tubular air port coaxial with said chamber and extending axially outwardly from said bottom wall, said air port having an inner end adjacent said bottom wall and an outer end spaced from said bottom wall, means for closing said outer end of said air port including a diaphragm transverse to said axis, said diaphragm covering said outer end of said chamber and said outer end of said air port, means for biasing said diaphragm against said outer end of said air port, first passageway means in said housing for connecting said inner end of said air port to said tire, second passageway means in said housing opening into said chamber and having an outer end for connecting said second passageway means to said source of air under pressure, and means rotatable relative to said housing for coupling said outer end of said second passageway means with said source of air under pressure.

2. A valve according to claim 1, wherein said means for biasing said diaphragm includes spring means.

3. A valve according to claim 1, wherein said annular chamber is a first chamber, said tubular air port is a first air port, and said diaphragm is a first diaphragm, a second annular chamber in said housing coaxial with said wheel axis and having a bottom wall and an open end spaced therefrom, a second tubular air port coaxial with said second chamber and extending axially away from said bottom wall thereof, said second air port having an inner end adjacent said bottom wall of said second chamber and an outer end spaced from said bottom wall of said second chamber, said means for closing said inner end of said air port including a second diaphragm transverse to said axis and covering said open end of said second chamber and said inner end of said second air port, said tire being a first tire, a second tire on said wheel means, said first passageway means including separate first passages for respectively connecting said outer ends of said first and second air ports to said first and second tires, and said passageway means including separate second passages respectively opening into said first and second chambers.

4. A valve according to claim 1, wherein said means for closing said inner ends of said air port includes spring means biasing said first and second diaphragms respectively against said inner ends of said first and second air ports.

5. A valve according to claim 2, wherein said outer ends of said first and second air ports are axially spaced apart and opposed, said first and second diaphragms are axially spaced apart and engage said outer ends of said first and second air ports in axially opposite directions, and said spring means is between said first and second diaphragms.

6. A valve according to claim 5, wherein said spring means includes a single compression spring.

7. A valve according to claim 1, wherein said valve housing has axially outer and inner ends with respect to said wheel means and comprises axially outer and inner housing members and an intermediate housing member therebetween, said intermediate housing member having axially outer and inner surfaces, said outer housing member having an axially inner surface facially engaging said outer surface of said intermediate member, said annular chamber being an annular recess in said inner surface of said outer housing surrounding a post having an axial bore providing said air port, said diaphragm being clampingly engaged between said outer and inner surfaces, a spring bore coaxial with said axis and extending inwardly of said intermediate member from said outer surface thereof, said spring bore having an outer end facing said diaphragm, spring means in said spring bore biasing said diaphragm against said post to close said bore therein, said outer housing member having a radially outer periphery, said first passageway means including a passage extending radially inwardly from said periphery and having an inner end communicating with said axial bore in said post, said outer end of said second passageway means opening into said axially outer end of said valve housing, and said second passageway means having an inner end opening into said annular recess.

8. A valve according to claim 7, wherein said intermediate housing member includes mounting means for mounting said valve housing on said wheel means.

9. A valve according to claim 7, wherein said axially outer end of said axially outer housing member includes an annular sleeve portion coaxial with said axis, said outer end of said second passageway means being coaxial with said sleeve portion, said means for coupling said outer end of said second passageway means with said source of air under pressure including a coupling member supported on said sleeve portion for rotation relative thereto, said coupling member including a passageway therethrough having a first end communicating with said outer end of said second passageway means and having a second end for connection with said source.

10. A valve according to claim 9, wherein said coupling member is cup-shaped and includes an outer end wall transverse to said axis and an annular skirt portion extending axially inwardly from said end wall and overlying said sleeve portion of said outer housing member in radially spaced relationship thereto, bearing means radially between said skirt portion and said sleeve portion, said sleeve portion having an axially inner end, said outer end of said second passageway means including an opening through said inner end of said sleeve portion, and said passageway through said coupling member including a conduit fixed relative to said coupling member, said conduit being coaxial with said axis and extending axially inwardly from said outer end wall of said coupling member and into said sleeve portion to said opening through said inner end thereof, and sealing means for sealing against the leakage of air between said opening and said conduit.

11. A valve according to claim 10, wherein said conduit extends into said sleeve portion in radially spaced relationship thereto, said sealing means including a sealing member radially between said sleeve portion and said conduit.

12. A valve according to claim 11, and lubricant retaining means radially between said sleeve portion and said conduit.

13. A valve according to claim 7, wherein said annular recess is a first annular recess, said air port is a first air port and said diaphragm is a first diaphragm, said axially inner housing member having an axially outer surface facially engaging said inner surface of said intermediate member, a second annular recess in said outer surface of said inner member surrounding a post having an axial bore providing a second air port, a second diaphragm clampingly engaged between said outer surface of said inner housing member and said inner surface of said intermediate member, said spring bore extending through said intermediate member between said outer and inner surfaces thereof and having outer and inner ends respectively facing said first and second diaphragms, said spring means in said spring bore biasing said first and second diaphragms to respectively close said first and second air ports, said inner housing member having a radially outer periphery, said first passageway means including a passage extending radially inwardly from said periphery of said inner housing member and having an inner end communicating with said axial bore providing said second air port, said inner end portion of said second passageway means being a first inner end portion, and said second passageway means including a second inner end portion opening into said second annular recess.

14. A valve according to claim 13, wherein said intermediate housing member includes mounting means for mounting said valve housing on said wheel means.

15. A valve according to claim 13, wherein said axially outer end of said axially outer housing member includes an annular sleeve portion coaxial with said axis, said outer end of said second passageway means being coaxial with said sleeve portion, said means for coupling said outer end of said second passageway means with said source of air under pressure including a coupling member supported on said sleeve portion for rotation relative thereto, said coupling member including a passageway therethrough having a first end communicating with said outer end of said second passageway means and having a second end for connection with said source.

16. A valve according to claim 15, wherein said coupling member is cup-shaped and includes an outer end wall transverse to said axis and an annular skirt portion extending axially inwardly from said end wall and overlying said sleeve portion of said outer housing member in radially spaced relationship thereto, bearing means radially between said skirt portion and said sleeve portion, said sleeve portion having an axially inner end, said outer end of said second passageway means including an opening through said inner end of said sleeve portion, and said passageway through said coupling member including a conduit fixed relative to said coupling member, said conduit being coaxial with said axis and extending axially inwardly from said outer end wall of said coupling member and into said sleeve portion to said opening through said inner end thereof, and sealing means for sealing against the leakage of air between said opening and said conduit.

17. A valve according to claim 16, wherein said conduit extends into said sleeve portion in radially spaced relationship thereto, said sealing means including a sealing member radially between said sleeve portion and said conduit.

18. A valve according to claim 16, and lubricant retaining means radially between said sleeve portion and said conduit.

19. A valve according to claim 19, wherein said conduit means is a single compression spring in said spring bore 20. A valve according to claim 19, wherein said conduit extends into said sleeve portion in radially spaced relationship thereto, said sealing means including a sealing member radially between said sleeve portion and said conduit, and lubricant retaining means radially between said sleeve portion and said conduit.

21. In a system for inflating and deflating a pneumatic tire of a vehicle having tire support means supporting said tire for rotation about an axis, said system comprising a source of air under pressure, flow line means between said source and said tire, normally closed tire isolating valve means in said flow line means for maintaining an existing air pressure in said tire, and control means for inflating and deflating said tire across said isolating valve means, said isolating valve means including a first housing mounted on said tire support means for rotation therewith about said axis, a second housing mounted on said first housing for rotation relative thereto about said axis, an air passageway through said housings having upstream and downstream ends with respect to the direction of flow from said source to said tire, said upstream end being in said second housing, said downstream end being in said first housing, and flow control means in said passageway for controlling the flow of air between said upstream and downstream ends thereof, the improvement comprising: said first housing including an annular diaphragm chamber coaxial with said axis and in flow communication with said upstream end of said passageway, an air port coaxial with and loading centrally to said chamber and having an upstream end and a downstream end, said downstream end being in flow communication with said downstream end of said passageway, and means for closing said air port including a diaphragm of elastomeric material covering said annular chamber and engaging said upstream end of said air port to close said passageway against the flow of air between said upstream and downstream ends thereof and means for biasing said diaphragm against said upstream end of said air port.

22. The improvement according to claim 21, wherein said means for biasing said diaphragm includes spring means.

23. The improvement according to claim 22, wherein said second housing includes first sleeve means coaxial with said axis and defining a portion of said passageway and said first housing includes second sleeve means coaxial with and surrounding said first sleeve means in radially spaced relationship thereto, and sealing means radially between said first and second sleeve means.

24. The improvement according to claim 23, and lubricant reservoir means radially between said first and second sleeve means.

25. The improvement according to claim 23, wherein said second housing includes a peripheral skirt coaxial with and radially spaced from said second sleeve means, and bearing means radially between said skirt and second sleeve means supporting said second housing for rotation relative to said first housing.

26. The improvement according to claim 25, and lubricant reservoir means radially between said first and second sleeve means.

27. The improvement according to claim 21, wherein said downstream end of said passageway includes first and second downstream ends, said diaphragm chamber being a first diaphragm chamber, said diaphragm being a first diaphragm, said air port being a first air port and said downstream end thereof being in flow communication with said first downstream end of said passageway, said first housing including a second annular diaphragm chamber coaxial with said axis and in flow communication with said upstream end of said passageway, a second air port coaxial with and leading centrally to said second chamber and having an upstream end and a downstream end, said downstream end of said second air port being in flow communication with said second downstream end of said passageway, and means for closing said second air port including a second diaphragm of elastomeric material covering said second annular chamber and engaging said upstream end of said second air port.

28. The improvement according to claim 27, wherein said means to close said first and second air ports includes spring means biasing said first and second diaphragms respectively against said upstream ends of said first and second air ports.

29. The improvement according to claim 27, wherein said upstream ends of said first and second air ports are axially opposed and spaced apart and said first and second diaphragms engage said upstream ends thereof in axially opposite directions.

30. The improvement according to claim 29, wherein said means to close said first and second air ports includes spring means biasing said first and second diaphragms respectively against said upstream ends of said first and second air ports.

31. The improvement according to claim 30, wherein said first and second diaphragms are axially spaced apart and said spring means includes a single compression spring therebetween.

* * * * *